United States Patent
Tagliavini (12)

(10) Patent No.: US 6,479,784 B1
(45) Date of Patent: Nov. 12, 2002

(54) METHOD FOR QUALITY CONTROL OF SPOT WELDING IN WELDING MACHINES

(75) Inventor: Antonio Tagliavini, Bologna (IT)

(73) Assignee: ADA Applicazioni Digitali E Analogiche S.r.l., Bologna (IT)

( * ) Notice: Subject to any disclaimer, the term of this patent is extended or adjusted under 35 U.S.C. 154(b) by 35 days.

(21) Appl. No.: 09/654,747

(22) Filed: Sep. 5, 2000

(30) Foreign Application Priority Data

Sep. 8, 1999 (IT) .......................................... BO99A0479

(51) Int. Cl.[7] ............................................... B23K 11/25
(52) U.S. Cl. ...................................................... 219/109
(58) Field of Search .................................. 219/109, 110

(56) References Cited

U.S. PATENT DOCUMENTS

| | | | | |
|---|---|---|---|---|
| 3,389,239 A | * | 6/1968 | Treppa et al. ............... | 219/109 |
| 3,445,768 A | * | 5/1969 | Ferguson .................... | 219/109 |
| 3,582,967 A | * | 6/1971 | Beckman et al. ........... | 219/109 |
| 4,242,561 A | * | 12/1980 | Long .......................... | 219/109 |
| 4,302,653 A | * | 11/1981 | Denning et al. ............ | 219/110 |
| 4,434,351 A | | 2/1984 | Shuji et al. | |
| 4,562,330 A | | 12/1985 | Rodrick | |
| 4,745,255 A | * | 5/1988 | Mettier ....................... | 219/110 |
| 5,291,423 A | | 3/1994 | Hans | |
| 5,313,041 A | | 5/1994 | Gideon et al. | |
| 5,343,011 A | * | 8/1994 | Fujii et al. .................. | 219/109 |

* cited by examiner

Primary Examiner—Clifford C. Shaw
(74) Attorney, Agent, or Firm—Guido Modiano; Albert Josif; Daniel O'Byrne

(57) ABSTRACT

A method for quality control of spot welding in a welding machine, consisting in estimating the energy of the welding spot through the integral of the welding power, the integration extremes of which are determined by the time interval between two successive zero crossings of the welding current.

25 Claims, 5 Drawing Sheets

METHOD FOR QUALITY CONTROL OF SPOT WELDING IN WELDING MACHINES

BACKGROUND OF THE INVENTION

The present invention relates to a method for quality control of spot welding in welding machines, particularly used for welding bodies of cans obtained from rectangular sheets of white latten meant to assume a cylindrical tubular shape.

The edges are welded electrically by passing under two rollers which constitute the welding electrodes. A flattened copper wire is interposed between each one of the rollers and the white latten in order to avoid direct contact of the roller with the white latten, with a consequent unacceptable accumulation of tin. Such wire, after being used on both sides, is discarded.

The effect of the heating produced by the welding current and of the compression produced by the rollers converts the edges into a welding bead.

A problem that is strongly felt in the above-cited welding technology is weld quality control. A poorly made weld can in fact cause considerable problems when the completed can is filled.

Various solutions have been proposed in order to detect welding defects on the production line; they are based on measuring the surface temperature, on measuring the thickness of the bead and especially on the measurement of electrical values, such as the welding current and the voltage drop, hereinafter termed welding voltage, that occurs across the weld due to the flow of the current. In this regard, solutions have been proposed which consist in detecting and processing the welding voltage.

The proposed embodiments are currently unreliable for assuredly identifying all the defective welding spots.

SUMMARY OF THE INVENTION

The aim of the present invention is to obviate the above-described drawbacks of conventional devices by providing a method, applicable to an apparatus, for quality control of spot welding.

Within the scope of this aim, an object of the present invention is to identify the existence of one or more defective welding spots in the body of the can, and to drive a suitable expulsion device in order to reject it.

A further object of the present invention is to provide the operator with suitable indications which allow him to monitor the operating conditions of the welding machine and optionally return them to optimum conditions by means of appropriate adjustments before said machine begins to produce rejects systematically.

A further object of the present invention is to stop the machine if the reject rate exceeds a certain limit.

Still a further object of the present invention is to achieve the above-cited aim in a simple way which is relatively easy to provide in practice, safe in use, effective in operation and relatively low in cost.

These and other objects are achieved by the present method for quality control of spot welding in a welding machine which comprises a transformer with primary and secondary windings, in which the output of a secondary circuit is connected to arms which support roller-type electrodes for said spot welding, a welding current and an impressed voltage being available on said secondary circuit, and a welding voltage being present between said roller-type electrodes, the method comprising the steps of:

sending to an adder a first voltage signal which corresponds to said welding voltage, acquired by means of a first differential amplifier;

sending to said adder a second voltage signal which corresponds to a voltage acquired by means of a second differential amplifier on a portion of said secondary circuit or on the primary winding of said transformer;

sending to said adder a third voltage signal which is correlated to a voltage signal which corresponds to said welding current, acquired by means of a transducer on said secondary winding or primary winding;

sending to a multiplier a sum signal, processed by said adder, and said voltage signal, said multiplier being adapted to calculate a power signal which corresponds to a welding power;

sending said power signal to an integrator which is adapted to provide an energy signal of said welding spot in integration over a time interval between two successive drops to zero of the welding current and such as to cancel out the reactive energy averaged over said interval; and sending said energy signal to an evaluation circuit for welding quality control.

BRIEF DESCRIPTION OF THE DRAWINGS

Further characteristics and advantages of the present invention will become better apparent from the following detailed description of a preferred but not exclusive embodiment of a method for quality control of spot welding in welding machines, illustrated only by way of non-limitative example in the accompanying drawings, wherein.

DESCRIPTION OF THE PREFERRED EMBODIMENTS

Figure 1:
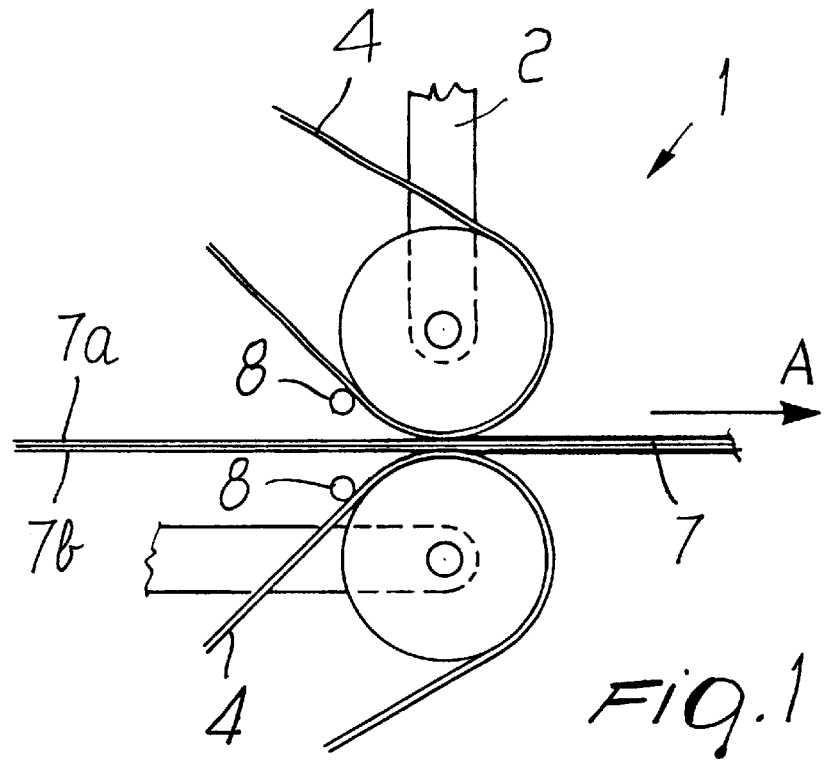
FIG. 1 is a schematic view of a detail of roller-type electrodes of a welding machine, according to the present invention.

With reference to FIG. 1, the reference numeral 1 generally designates the roller-type electrodes of a welding machine according to the present invention. The electrodes 1 are rotatably supported by a pair of vertically movable arms 2 which are electrically connected to the secondary winding 3a of a transformer 3 (see FIG. 2) and are surrounded by a copper wire 4 which is drawn from a coil and then sent to a disposal device, both of which are not shown in the accompanying drawings.

At the inlet of the roller-type electrodes 1 there are provided two end flaps 7a, 7b of a rectangular metallic sheet of white latten which move in the direction of the arrow A;

at the outlet a bead 7 is provided which is formed by the welding of the pair of flaps 7a, 7b and moves in the direction of the arrow A.

At the inlet, two contacts 8 are provided which slide/roll on the pair of copper wires 4. The contacts 8 are adapted to acquire a welding voltage Vs a(voltage drop) that occurs across the pair of flaps 7a, 7b as a consequence of the passage of the welding current Is.

Figure 2:
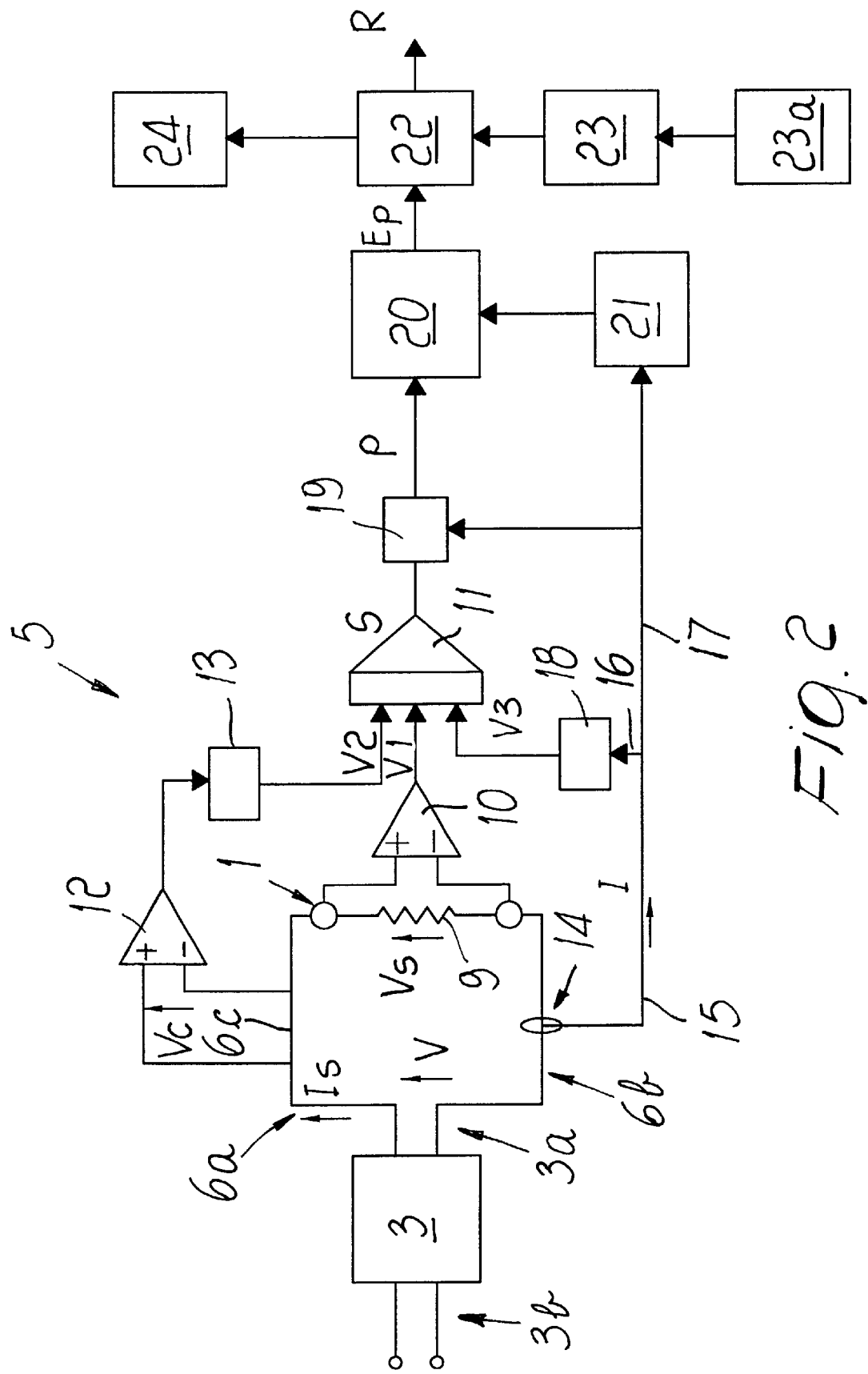
FIG. 2 is a combined electrical and process diagram for welding quality control, according to the present invention.

With particular reference to FIG. 2, the reference numeral 5 generally designates an electrical and process diagram according to the present invention.

The arms 2 are represented schematically and electrically by means of a pair of electrical branches 6a, 6b which are connected to the output of the secondary winding 3a and end on the roller-type electrodes 1. The primary winding 3b of the transformer 3 is supplied by a power source, not shown in the accompanying drawings, which applies to the input of the pair of arms 6a, 6b a voltage V which causes the flow, in the circuit, of a welding current Is and produces the welding voltage Vs between the roller-type electrodes 1.

The pair of flaps 7a, 7b of FIG. 1 is shown schematically and electrically by means of a welding resistor 9 which is comprised between the roller-type electrodes 1. A differential amplifier 10 is connected in parallel to the welding resistor 9 and acquires the welding voltage Vs across the welding resistor 9, processes it and sends it as the first voltage signal V1, which corresponds to the welding voltage Vs, to an adder 11.

On the portion 6c of the branch 6a another differential amplifier 12 is provided which is parallel-connected and acquires a voltage Vc which has a significant quadrature component with respect to the welding current Is. The voltage Vc is processed and sent to a first voltage amplifier 13, where it is multiplied by a negative voltage coefficient Kv which can vary by means of the voltage amplifier 13 and provides a second voltage signal V2 which by vector sum with the first voltage signal V1, attenuates its parasitic component in quadrature with respect to the welding current Is.

At the branch 6b there is provided a transducer 14 which is preferably constituted by a Hall-effect probe and provides a voltage signal I which corresponds to the welding current Is. The voltage signal I, by means of a conductor 15 and a first branch 16 thereof, enters a second voltage amplifier 18 which multiplies it by a negative and adjustable current coefficient Ki. The output of the second voltage amplifier 18 provides the adder 11 with a third voltage signal V3 which by vector sum with the voltage signal V1 attenuates its parasitic component in phase with respect to the welding current.

The adder 11, after performing the vector sum of the three voltage signals V1, V2 and V3, sends the sum signal S, stripped of its phase and quadrature parasitic components, to a multiplier 19. The multiplier 19 also receives in input, in addition to the sum signal S, the voltage signal I that arrives from the second branch 17 and provides in output a signal P which corresponds to the instantaneous welding power.

The signal P is sent to the output of an integrator 20, which by integrating it over a time interval comprised between two successive drops to zero of the welding current, provides in output an energy signal Ep whose value, at the end of said interval, corresponds to the total active energy transferred to the resistor 9 during a welding spot.

The integrator 20 is cyclically reset by a reset circuit 21 which receives in input the voltage signal 1 in order to detect the instants when it drops to zero; these instants delimit the various welding spots. Moreover, said circuit 21 controls the reading of the signal Ep at the end of the integration cycle and the transfer of the final value to an evaluation circuit 22 and to a memory circuit 23.

The memory circuit 23 receives in input, by means of an interface 23a which is controlled manually by the operator, the amplitude values of a static tolerance band Bs and a dynamic tolerance band Bd.

The static tolerance band Bs is related to the value of the average welding energy measured on a single can or on a group of reference cans welded properly at machine startup.

The dynamic tolerance band Bd is instead referred to the value of the average welding energy, calculated for example as a floating average over a certain number of consecutive cans during the operation of the machine from the circuit 23. Bd is usually narrower than Bs.

The bands Bs and Bd are sent to the comparator circuit 22, which is designed to evaluate the acceptability of the product, actuating rejection and optionally even the halting of the machine. In the circuit 22, the energy signal Ep related to the single spot is examined, alone or together with the signal of the contiguous welding spots, in order to evaluate the acceptability of the product by following appropriate criteria.

In the case of the simplest criterion, the energy signal Ep of the individual spot is examined individually and compared with the band Bd.

If the energy signal Ep of the individual spot does not fall within said interval, the can must be rejected. The rejection is performed by the circuit 22 which by emitting a signal R drives expulsion means, not shown in the figure.

In order to prevent the occurrence of drift errors caused for example by the heating of the machine, the welding machine is halted if the band Bd exits from the static tolerance band Bs.

At the same time, the energy signal Ep of the individual welding spot and/or of the average energy Em of the welding spots of a single can are displayed on a display 24 in order to provide the operator with indications as to the operation of the machine. Such display can occur in the two following manners:

the energy values of all the welding spots of the same can are displayed, so as to provide the operator with an image of the welding energy profile of the individual can;

the average, minimum and maximum values of the energy signal Ep of the individual spot are displayed at the same abscissa for a single can.

In the first case, a point on the chart corresponds to a welding spot; in the second case it corresponds to an entire can. The first method can be very useful in order to allow rejection analysis, while the second method can allow the operator to follow in real time the behavior of the welding process.

Figure 3:
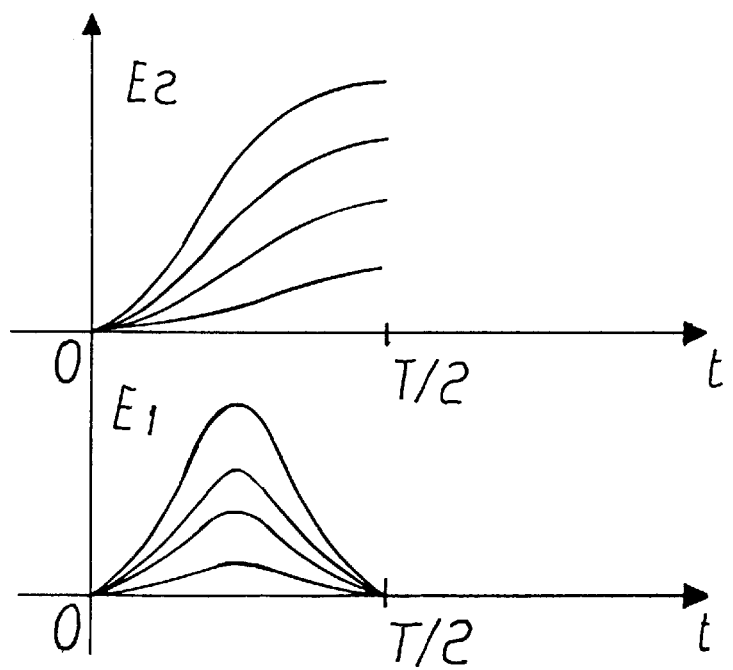
FIG. 3 plots charts which represent, in qualitative terms, the criteria for adjusting the compensations of the phase and quadrature parasitic components described hereinafter.

Optimum adjustment of the compensation coefficients kv and ki associated with the second and third signals can be easily determined if the welding resistance 9 is equal to zero; this condition can be achieved simply by operating the welding machine without passing cans between the two welding rollers. In these conditions, as shown in FIG. 3, the coefficient ki can be adjusted in order to bring to zero the value of the energy at the end of the time interval that defines the welding spot (FIG. 3, E2). This adjustment compensates the effect of the resistances of the elements through which the welding current passes and which lie between the points where the voltage Vs is acquired and the actual welding bead constituted by the pair of overlapping flaps 7a, 7b.

The coefficient kv can be adjusted so as to minimize the value of the energy in the middle region of the welding spot (FIG. 3, E1).

It should be observed that this adjustment does not alter the final value of the energy in the welding spot, since it acts on the reactive energy, whose average value in a point is theoretically zero in any case. This adjustment helps to obtain higher precision in evaluating the active energy.

In this way, after choosing the optimum coefficients Kv and Ki, the energy signal Ep of the welding spot displayed on the display 24 is the energy actually transferred during welding to the pair of flaps 7a, 7b; the temperature increase, and therefore the correct melting, of the pair of flaps 7a, 7b in fact depends on the transferred energy.

With respect to conventional systems, the present invention evaluates the energy of the individual welding spot, integrating the product of welding voltage and current over a time interval comprised between two successive zero crossings of the current, differently from conventional systems, which are based on a simple evaluation of the welding voltage.

It has been observed that the present invention fully achieves the intended aim and objects.

The invention thus conceived is susceptible of numerous modifications and variations, all of which are within the scope of the inventive concept.

Figure 4:
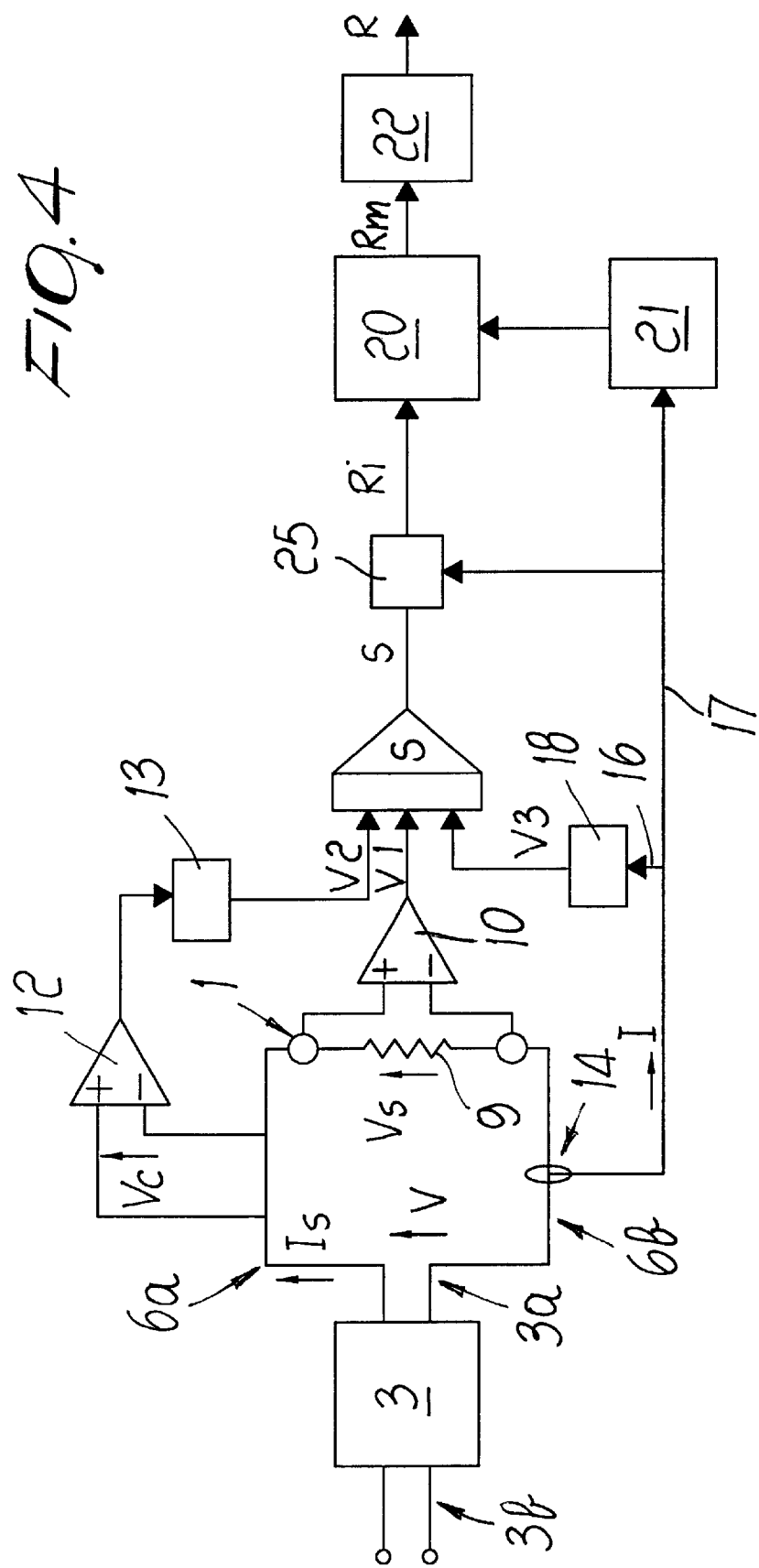
FIG. 4 illustrates a second embodiment of the electrical and process diagram for welding quality control, according to the present invention.

A second embodiment of the invention consists in replacing the multiplier 19 with a divider 25 (as shown in FIG. 4), which provides in output a signal which is representative of the welding resistance Ri. The signal representing the welding resistance Ri is processed by the integrator 20, which by integrating the signal Ri over an interval comprised between two successive zero crossings of the welding current sends to the circuit 22 the average welding resistance Rm, which is compared with predefined values in order to consider the welding spot acceptable in terms of quality.

The value of the average welding resistance Rm is highly significant, since it provides information on the thickness of the material and on the presence of any impurities.

Figure 5:
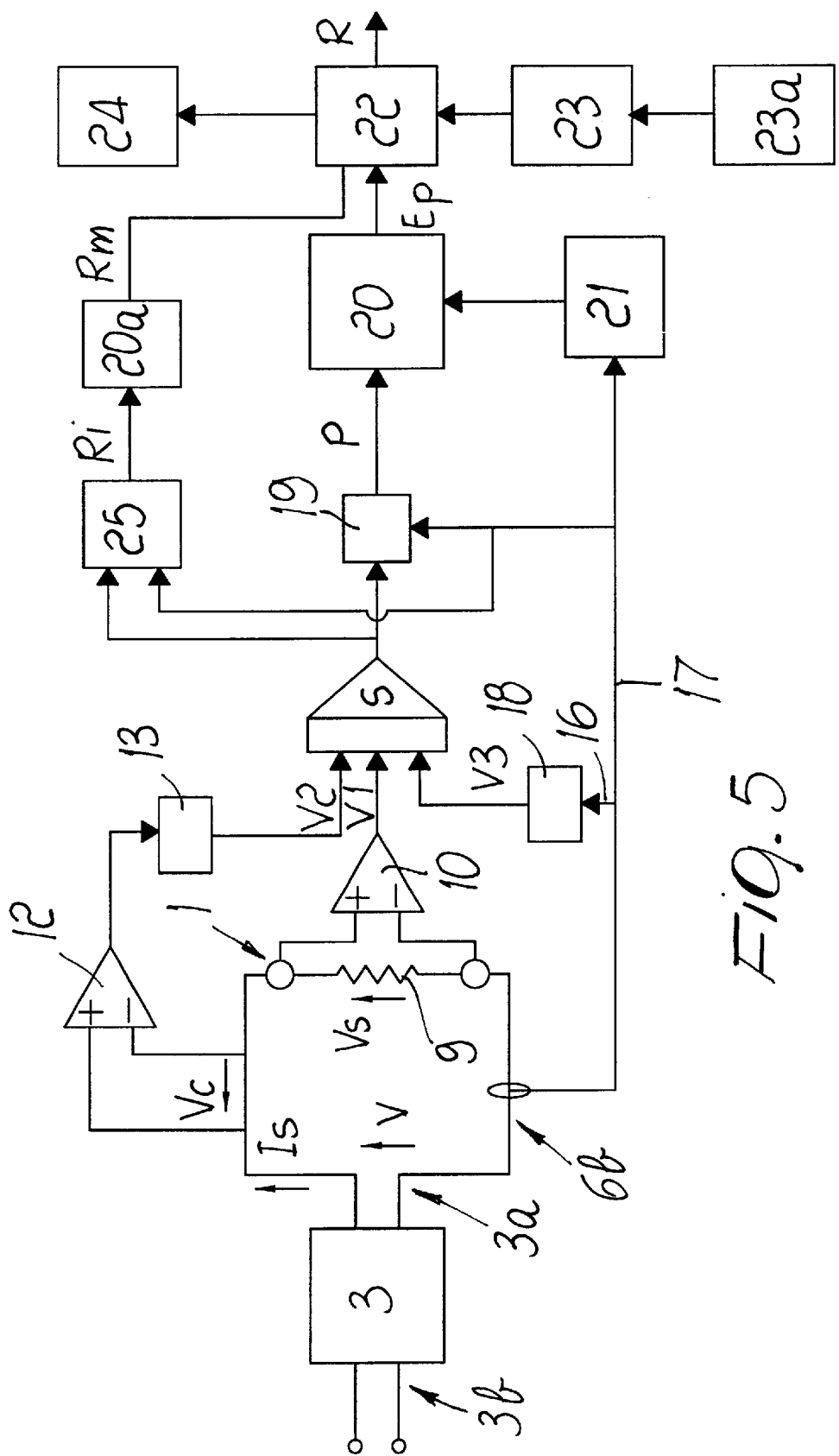
FIG. 5 illustrates a third embodiment of the electrical and process diagram for welding quality control, according to the present invention.
Figure 6:
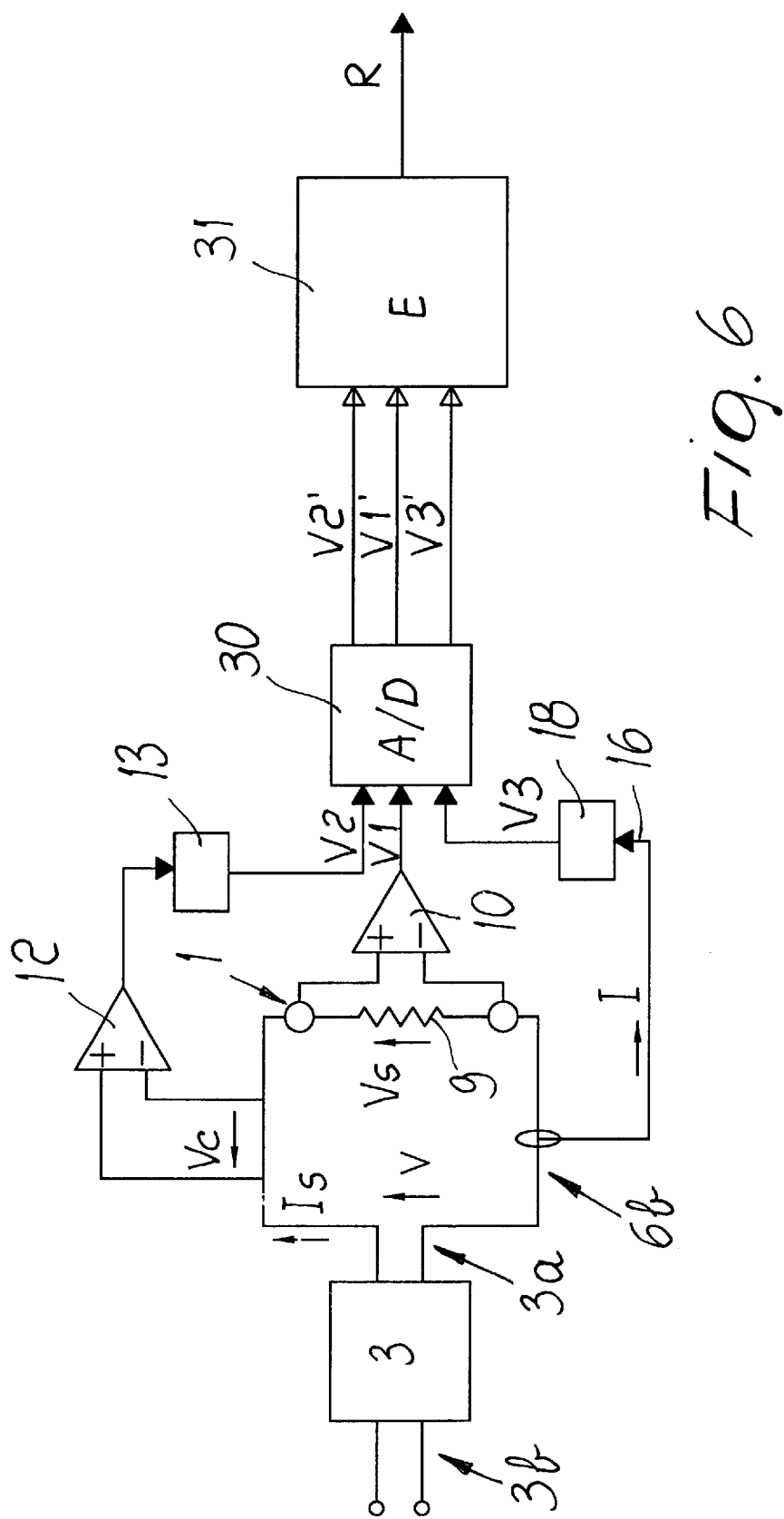
FIG. 6 illustrates a fourth embodiment of said electrical and process diagram for welding quality control.

A third embodiment of the invention with respect to the electrical and process diagram shown in FIGS. 2 and 4 consists in arranging in parallel the divider 25 (FIG. 5) and the multiplier 19. The divider 25 is followed by an integrator 20a, whose output Rm is supplied to the evaluation circuit 22. This embodiment is a way to establish excellent welding quality control, since it performs a monitoring which includes both evaluation of the energy signal Ep of the welding spot and evaluation of the average resistance Rm. In this way it is in fact possible to identify more assuredly the defective points and determine the cause of the defect more easily.

A fourth embodiment of the invention consists of an analog/digital apparatus which is constituted by an analog/digital converter 30 which receives in input the three voltage signals V1, V2, V3. The converter 30 converts the three input signals into respective digital voltage signals V1', V2', V3' which are processed by a processor which runs a numeric program which performs the method.

Still a further embodiment of the described devices, not shown in the accompanying drawings, consists in acquiring the voltage Vc by means of the differential amplifier 11 across the primary circuit of the transformer 3.

All the details may further be replaced with other technically equivalent ones.

In practice, the materials employed, as well as the shapes and the dimensions, may be any according to requirements without thereby abandoning the protective scope of the claims that follow.

The disclosures in Italian Patent Application No. BO99A000479 from which this application claims priority are incorporated herein by reference.

What is claimed is:

1. A method for quality control of spot welding in a welding machine which comprises a transformer with primary and secondary windings, in which the output of a secondary circuit is connected to arms which support roller-type electrodes for said spot welding, a welding current and an impressed voltage being available on said secondary circuit, and a welding voltage being present between said roller-type electrodes, comprising the steps of:

sending to an adder a first voltage signal which corresponds to said welding voltage, acquired by means of a first differential amplifier;

sending to said adder a second voltage signal which corresponds to a voltage acquired by means of a second differential amplifier on a portion of said secondary circuit or on the primary winding of said transformer;

sending to said adder a third voltage signal which is correlated to a voltage signal which corresponds to said welding current, acquired by means of a transducer on said secondary winding or primary winding;

sending to a multiplier the sum signal, processed by said adder, and said voltage signal which corresponds to said welding current, said multiplier being adapted to calculate a power signal which corresponds to the welding power;

sending said power signal to an integrator which is adapted to provide an energy signal of said welding spot in integration over a time interval between two successive drops to zero of the welding current and such as to cancel out the reactive energy averaged over said interval;

sending said energy signal to an evaluation circuit for welding quality control.

2. The method according to claim 1, wherein said third voltage signal is adapted to compensate the parasitic component of said welding voltage in phase with said welding current, said third signal being proportional to said voltage signal by means of a current coefficient which can be adjusted so as to perform said compensation.

3. The method according to claim 2, wherein said second voltage signal is adapted to compensate the parasitic component of said welding voltage in quadrature to said welding current, said second voltage signal being proportional to said voltage by means of a voltage coefficient which can be adjusted so as to perform said compensation.

4. The method according to claim 3, wherein optimization of said voltage and current coefficients is determined by minimizing a first welding energy signal in a middle region of said time interval, said first energy signal being associated with said parasitic component in quadrature to said welding current, and by minimizing a second welding energy signal at the end of said time Interval, said second energy signal being associated with said parasitic component in phase with said welding current when the welding resistance is equal to zero.

5. The method according to claim 1, wherein said energy signal of the welding spot is controlled so as to remain within tolerance bands in order to obtain quality welding.

6. The method according to claim 1, wherein said time interval is forced by a reset circuit which receives in input said current signal.

7. A method for spot welding quality control in a welding machine comprising a transformer with primary and secondary windings, in which the output of a secondary circuit is connected to arms which support roller-type rollers for said spot welding, a welding current and an impressed voltage being available on said secondary circuit, a welding voltage occurring between said roller-type electrodes, comprising the steps of:

- sending to an adder a first voltage signal which corresponds to said welding voltage, acquired by means of a first differential amplifier;
- sending to said adder a second voltage signal which corresponds to a voltage acquired by means of a second differential amplifier on a portion of said secondary circuit or on the primary winding of said transformer;
- sending to said adder a third voltage signal which is correlated to a voltage signal which corresponds to said welding current, acquired by means of a transducer on said secondary winding or primary winding;
- sending to a divider a sum signal, processed by said adder, and said voltage signal which corresponds to said welding current, said divider being adapted to calculate a signal which corresponds to a welding resistance;
- sending said signal which corresponds to the welding resistance to an integrator which is adapted to provide an average welding resistance signal in integration over a time interval between two successive drops to zero of the welding current, and
- sending said average resistance signal to an evaluation circuit for welding quality control.

8. An analog apparatus for spot welding quality control in a welding machine, comprising a transformer in which the output of a secondary circuit is connected to arms which support roller-type electrodes for said spot welding, a welding current and an impressed voltage being available on said secondary circuit and a welding voltage occurring between said roller-type electrodes, comprising an adder which receives in input a first volt signal which corresponds to said welding voltage acquired from said roller-type electrodes by means of a first differential amplifier, a second voltage signal, which is acquired on a portion of said secondary circuit or on a primary winding of said transformer by means of a second differential amplifier, and a third voltage signal which is correlated with a voltage signal which corresponds to said welding current and is acquired by means of a transducer on said secondary or primary circuit, a multiplier which receives in input the output of said adder and said voltage signal which corresponds to said welding current, an integrator which receives in input a power signal which arrives from the output of said multiplier, said integrator providing the energy signal of a welding spot in the integration of said power signal over a time interval comprised between two successive zero crossings of the welding current.

9. The apparatus according to claim 8, comprising a reset circuit which receives in input said voltage signal and is adapted to provide in output said time interval.

10. The apparatus according to claim 8, wherein said welding voltage is acquired by means of contacts which slide/roll on a conducting wire which wraps around said roller-type electrodes.

11. The apparatus according to claim 8, wherein said welding voltage is acquired by means of terminals on said arms.

12. The apparatus according to claim 8, comprising a first voltage amplifier which is arranged between said second differential amplifier and said adder, said first amplifier varying a voltage coefficient.

13. The apparatus according to claim 8, comprising a second voltage amplifier arranged between the conductor for transmitting said current signal and said adder, said second voltage amplifier varying a current coefficient.

14. An analog apparatus for spot welding quality control in a welding machine, comprising a transformer in which the output of a secondary circuit is connected to arms which support roller-type electrodes for said spot welding, a welding current and an impressed voltage being available on said secondary circuit and a welding voltage occurring between said roller-type electrodes, comprising an adder which receives in input a first voltage signal which corresponds to said welding voltage, acquired from said roller-type electrodes by means of a first differential amplifier, a second voltage signal which is acquired on a portion of said secondary circuit or on a primary winding of said transformer by means of a second differential amplifier, and a third voltage signal which is correlated a voltage signal which corresponds to said welding current and is acquired by means of a transducer on said secondary or primary circuit, a divider which in input the output of said adder and said voltage signal which corresponds to said welding current an integrator which receives in input the signal that represents the welding resistance that arrives from the output of said divider, said integrator being adapted to provide the average welding resistance of a welding spot in me integration of said power over a time interval comprised between two successive zero crossings of the welding current.

15. The apparatus according to claims 14, comprising a reset circuit which receives in input said voltage signal and is adapted to provide in output said time interval.

16. The apparatus according to claim 14, wherein said welding voltage is acquired by means of contacts which slide/roll on a conducting wire which wraps around said roller-type electrodes.

17. The apparatus according to claim 14, wherein said welding voltage is acquired by means of terminals on said arms.

18. The apparatus according to claim 14, comprising a first voltage amplifier which is arranged between said second differential amplifier and said adder, said first amplifier being adapt to vary a voltage coefficient.

19. The apparatus according to claim 14, comprising a second voltage amplifier arranged between the conductor for transmitting said current signal and said adder, said second voltage amplifier varying a current coefficient.

20. An analog/digital apparatus for spot welding quality; control in a welding machine which comprises a transformer in which the output of a secondary circuit is connected to arms which support roller-type electrodes for said spot welding, a welding current and an impressed voltage being available on said secondary circuit and a welding voltage occurring between said roller-type electrodes, comprising an analog/digital converter which receives in input a first voltage signal which corresponds to said welding voltage, acquired from sad roller-type electrodes by means of a first differential amplifier, a second voltage signal which is acquired on a portion of said secondary circuit or on the primary winding of said transformer by means of a second differential amplifier, and a third voltage signal which is correlated to a voltage signal which corresponds to said welding current and is acquired by means of a transducer on said secondary or primary circuit, a processor which receives in input the output of said converter and is adapted to run a numeric program which performs said method according to claim 1.

21. The apparatus according to claim 20, comprising a reset circuit which receives in input said voltage signal and is adapted to provide in output said time interval.

22. The apparatus according to claim 20, wherein said welding voltage is acquired by means of contacts which slide/roll on a conducting wire which wraps around said roller-type electrodes.

23. The apparatus according to claim 20, wherein said welding voltage is acquired by means of terminals on said arms.

24. The apparats according to claim 20, comprising a first voltage amplifier which is arranged between said second differential amplifier and said adder, said first amplifier varying a voltage coefficient.

25. The apparatus according to claim 20, comprising a second voltage amplifier arranged be n the conductor for transmitting said current signal and said adder said second voltage amplifier varying a current coefficient.

* * * * *